(No Model.)

H. C. SWAN.
STEP PAD.

No. 605,357. Patented June 7, 1898.

WITNESSES

INVENTOR

UNITED STATES PATENT OFFICE.

HENRY C. SWAN, OF OSHKOSH, WISCONSIN.

STEP-PAD.

SPECIFICATION forming part of Letters Patent No. 605,357, dated June 7, 1898.

Application filed March 19, 1898. Serial No. 674,463. (No model.)

*To all whom it may concern:*

Be it known that I, HENRY C. SWAN, of Oshkosh, in the county of Winnebago and State of Wisconsin, have invented a new and useful Improvement in Step-Pads, of which the following is a full, clear, and exact description, reference being had to the accompanying drawings, forming part of this specification, in which—

Figure 1:
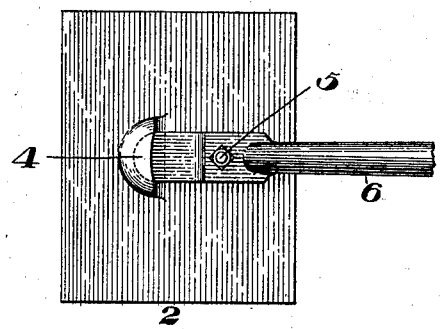
Figure 2:
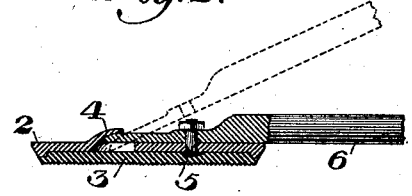

Figure 1 is a bottom plan view of a step-pad constructed in accordance with my invention, and Fig. 2 is a cross-section of the same.

My invention is designed to improve the devices for fastening step-pads to their shanks, and it is especially applicable to pads which are covered with a layer of rubber or similar material, wherein the head of the securing-bolt is inaccessible.

In the drawings, 2 represents the step-pad, having secured thereto the covering 3, of rubber or other suitable material. Upon the bottom of the pad is provided a curved lip 4, which is preferably formed by striking up a portion of the metal plate itself forming the pad, though this lip may be formed in other ways without departing from my invention.

5 is a securing-bolt which extends through a hole in the shank 6 and coöperates with the lip 4 in holding the pad securely to the shank.

In assembling the parts the end of the shank, which is preferably curved to fit the inner face of the lip, is slipped under this lip with the shank in the inclined position shown in dotted lines in Fig. 2. The shank then being swung downwardly the bolt passes up through the hole therein and the parts assume the position shown in full lines, the nut then being screwed into place upon the bolt, so that the shank is rigidly secured to the pad, the lip or loop 4 preventing any swinging or tilting of the pad.

The advantages of my invention will be apparent to those skilled in the art, since a simple, cheap, and effective fastening device is provided by which the shank and pad may be rigidly secured together, while pads of different sizes and shapes may be employed with the same shank.

Many changes may be made in the form of the loop or lip, the pad, and the shank without departing from my invention, since

I claim—

1. The combination with a pad having a projecting lip, of a shank having its end arranged to fit under this lip and provided with a hole arranged to receive a bolt upon the pad.

2. The combination with a pad having an intermediate lip struck up therefrom and a bolt secured in said pad; of a shank having a flattened end portion arranged to fit under the lip, and a hole to receive the pad-bolt.

In testimony whereof I have hereunto set my hand.

HENRY C. SWAN.

Witnesses:
 DUNZIE W. GARRINGTON,
 MILFORD LEWIS.